(12) United States Patent  
Miyauchi et al.

(10) Patent No.: US 7,310,210 B2  
(45) Date of Patent: Dec. 18, 2007

(54) MAGNETORESISTIVE SENSOR HAVING COBALT-IRON ALLOY LAYER IN FREE LAYER

(75) Inventors: Daisuke Miyauchi, Tokyo (JP); Tomohito Mizuno, Tokyo (JP)

(73) Assignee: TDK Corporation, Tokyo (JP)

( * ) Notice: Subject to any disclaimer, the term of this patent is extended or adjusted under 35 U.S.C. 154(b) by 387 days.

(21) Appl. No.: 11/043,118

(22) Filed: Jan. 27, 2005

(65) Prior Publication Data

US 2005/0168888 A1 Aug. 4, 2005

(30) Foreign Application Priority Data

Jan. 30, 2004 (JP) ............... 2004-023267  
Oct. 14, 2004 (JP) ............... 2004-299979

(51) Int. Cl.  
*G11B 5/127* (2006.01)

(52) U.S. Cl. ................................. 360/324.12
(58) Field of Classification Search ............ None  
See application file for complete search history.

(56) References Cited

U.S. PATENT DOCUMENTS

| | | | | |
|---|---|---|---|---|
| 6,947,263 | B2* | 9/2005 | Saito ............... | 360/324.12 |
| 2003/0011463 | A1 | 1/2003 | Iwasaki et al. | |
| 2003/0090844 | A1 | 5/2003 | Shimizu et al. | |
| 2004/0145850 | A1* | 7/2004 | Fukumoto et al. ...... | 361/143 |
| 2006/0061917 | A1* | 3/2006 | Gill et al. ............ | 360/324.12 |

FOREIGN PATENT DOCUMENTS

| | | |
|---|---|---|
| JP | 2003-8103 | 1/2003 |
| JP | 2003-152239 | 5/2003 |

\* cited by examiner

*Primary Examiner*—Allen Cao  
(74) *Attorney, Agent, or Firm*—McGinn I.P. Law Group PLLC

(57) ABSTRACT

A magnetoresistive sensor comprises a pinned layer having a magnetization direction fixed with respect to an external magnetic field, a free layer, having a magnetization direction variable in accordance with the external magnetic field, and a spacer layer mainly containing copper, sandwiched between the pinned layer and the free layer. A sense current flows through the pinned layer, the spacer layer, and the free layer substantially in a direction in which the layers are stacked. The free layer comprises at least one intermediate stack composed of a non-magnetic layer mainly containing copper, and a first cobalt iron layers made of a cobalt iron alloy and disposed on boundaries on both sides of the non-magnetic layer, a nickel iron alloy layers disposed on boundaries on both sides of the intermediate stack, and a second cobalt iron layer made of a cobalt iron alloy and formed in contact with the spacer layer on a boundary, opposing the spacer layer, of a stack composed of the intermediate stack and the nickel iron alloy layer.

11 Claims, 5 Drawing Sheets

MAGNETORESISTIVE SENSOR HAVING COBALT-IRON ALLOY LAYER IN FREE LAYER

BACKGROUND OF THE INVENTION

1. Field of the Invention

The present invention relates to a magnetoresistive sensor, a thin-film magnetic head, a head gimbal assembly, and a hard disk device, and more particularly, to a magnetoresistive sensor for use in thin-film magnetic heads of magnetic storage apparatuses such as a hard disk device and the like.

2. Description of the Related Art

To accommodate the trend of increasingly higher a real density for magnetic recording, magnetic heads using GMR (Giant Magnetoresistive) sensors have been developed for use as a read element. Among others, a GMR sensor using a spin valve (SV) film can provide a magnetic head having a higher sensitivity by virtue of its large change in magnetoresistance to a sense current applied to the device for reading data recorded on a recording medium. Here, the SV film refers to stacked layers which comprise a ferromagnetic layer that has the direction of magnetization fixed in one direction (hereinafter also referred to as a "pinned layer"), a ferromagnetic layer that changes the direction of magnetization in accordance with an external magnetic field generated by a recording medium (hereinafter also referred to as a "free layer), and a non-magnetic intermediate layer interposed between the two ferromagnetic layers. In a SV film, the magnetization direction of the free layer makes an angle relative to the magnetization direction of the pinned layer, in accordance with the external magnetic field, such that spin dependent scattering of conductive electrons vary in accordance with the relative angle to cause a change in magnetoresistance. A magnetic head detects this change in magnetoresistance to read magnetic information on the recording medium.

While prevalent in MR device using a SV film is a CIP (Current in Plane)-GMR sensor in which a sense current flows in parallel to the layers, in order to accommodate a further increase in areal density, development has been recently advanced for a magnetic head using a CPP (Current Perpendicular to the Plane)-GMR sensor in which a sense current flows perpendicularly to the layers. While CPP type sensor includes a TMR (Tunnel Magneto-resistance) sensor using a TMR layer, a CPP-GMR sensor is expected as a sensor having a high potential because of its lower resistance as compared with a TMR sensor, and its ability to generate higher output power for data read even from a narrow track as compared with a CIP-GMR sensor.

However, if an SV film having a stack configuration similar to that of a CIP-GMR sensor is simply applied to a CPP-GMR sensor, the resulting CPP-GMR sensor cannot provide a sufficient change in magnetoresistance. This is mainly because the resistance of portions (free layer, pinned layer, and non-magnetic intermediate layer) contributing to a change in magnetoresistance occupies only a small proportion in the overall resistance of the device. Specifically, a CIP-GMR sensor can ensure a sufficient change in magnetoresistance in the in-plane direction due to spin dependent scattering on the layer boundaries, since the sense current conducts in the in-plane direction of the layers. Whereas in a CPP-GMR sensor, since the sense current flows perpendicularly through the layers, i.e., layer boundaries, it causes only insufficient spin dependent scattering on the boundaries. In addition, since conventional GMR sensors have only two boundaries, one is between the non-magnetic intermediate layer and the free layer and the other is between the non-magnetic intermediate layer and the pinned layer, the boundaries contribute less to the change in magnetoresistance. These are considered as a major factor. On the other hand, in a CPP-GMR sensor, since the sense current flows through each layer, scattering of conducting electrons within the each layer, i.e., bulk scattering is generally larger than a CIP sensor, thus lending itself to contribution to a larger change in magnetoresistance. For this reason, in a CPP-GMR sensor, thicker free layer and pinned layer are effective for ensuring a larger change in magnetoresistance.

Alternatively, instead of increasing the thicknesses of the free layer and pinned layer of a SV film, a non-magnetic intermediate layer may be inserted within the free layer or the pinned layer to increase the number of boundaries, thereby enhancing the magnetoresistive effect, as disclosed, for example, in the specification etc. of Japanese Patent Laid-open Publication No. 2003-152239. This specification etc. discloses a free layer configuration which is comprised of a stack of a nickel iron ally CoFeB, non-magnetic layer Cu, and a cobalt iron alloy (CoFeB/Cu/CoFeB stack configuration). Such a layer configuration can provide a larger change in magnetoresistance, because there is larger spin polarization on the boundaries between the CoFe-based alloy layers and Cu layer to promote the spin dependent scattering.

Further, in a free layer of a CIP-GMR sensor, there is disclosed a layer configuration comprised of a stack using CoFe/NiFe and a Cu layer, (NiFe/CoFe/Cu/CoFe/NiFe layer configuration). See, for example, in the specification etc. of Japanese Patent Laid-open Publication No. 2003-8103. The stack of CoFe and NiFe can provide a larger spin polarization on the CoFe/Cu boundaries, together with soft magnetic characteristics of NiFe.

In this way, while the free layer and the pinned layer tend to be thicker in a CPP-GMR sensor, a reduction in noise and consistent stability are important requirements in the free layer, thus rendering the soft magnetic characteristics important for ensuring these requirements. Further, from a view point of an increase in sensitivity of a head, the soft magnetic characteristics play an important role. In order to increase the sensitivity, the direction of magnetization of the free layer must be rotated with a limited amount of magnetic flux of a recording medium, so that a thicker free layer is not desirable.

Also, while the above-mentioned specifications etc. disclose a general layer configuration for a free layer which exhibits a larger change in magnetoresistance, they do not clarify a preferred layer configuration in consideration of the characteristic of change in magnetoresistance, and soft magnetic characteristics such as magnetostriction.

SUMMARY OF THE INVENTION

It is an object of the present invention to provide a magnetoresistive sensor which excels in the soft magnetic characteristics of a free layer, and is capable of accomplishing a larger change in magnetoresistance. It is another object of the present invention to provide a thin-film magnetic head etc. which use the magnetoresistive sensor.

A magnetoresistive sensor according to the present invention comprises a pinned layer having a magnetization direction fixed with respect to an external magnetic field, a free layer, having a magnetization direction variable in accordance with the external magnetic field, and a spacer layer mainly containing copper, sandwiched between the pinned layer and the free layer. A sense current flows through the pinned layer, the spacer layer, and the free layer substantially in a direction in which the layers are stacked. The free layer comprises at least one intermediate stack having a non-magnetic layer mainly containing copper, and first cobalt iron layers made of a cobalt iron alloy and disposed on boundaries on both side of the non-magnetic layer, a nickel iron alloy layer disposed over both side boundaries of the intermediate stack, and a second cobalt iron layer made of a cobalt iron alloy and formed in contact with the spacer layer on a boundary of a stack composed of the intermediate stack and the nickel iron alloy layers wherein the boundary opposing the spacer layer.

In the magnetoresistive sensor configured as described above, by providing the free layer with the intermediate stack having the non-magnetic layer sandwiched by cobalt iron alloy layers on the boundaries on both sides, the spin polarizability is increased at the boundaries of the non-magnetic layer, resulting in an increased magnetoresistive effect. Also, by sandwiching the intermediate stack with nickel iron alloy layers, the soft magnetic characteristics are improved. Consequently, the resulting magnetoresistive sensor can present a larger change in magnetoresistance and good soft magnetic characteristics. Also, by inserting the cobalt iron alloy layer on the boundary of the stack composed of the intermediate stack and the nickel iron alloy layers on the side of the spacer layer, it is possible to enhance the boundary scattering effect, thereby limiting diffusion with the spacer layer, causing an increase in the bulk scattering effect.

A thin-film magnetic head according to the present invention includes the foregoing magnetoresistive sensor on an air bearing surface opposing a recording medium for reading data recorded on the recording medium.

A head gimbal assembly according to the present invention includes a slider including the thin-film magnetic head and disposed opposite to the recording medium, and a suspension for resiliently supporting the slider.

A hard disk drive according to the present invention includes a slider including the thin-film magnetic head, and disposed opposite to a disciform recording medium driven for rotation, and a positioning device for supporting the slider and positioning the slider relative to the recording medium.

As described above, according to the present invention, the magnetoresistive effect is improved by the free layer which contains the intermediate stack having the non-magnetic layer sandwiched by the nickel iron alloy layers on both the boundaries, and the soft magnetic characteristics are improved by sandwiching this intermediate stack with the nickel iron alloy layers. Consequently, the present invention can provide a magnetoresistive sensor which is further improved in the magnetic characteristics required for a free layer of a CPP-GMR sensor and excels in the quality of reproduced output.

The above and other objects, features and advantages of the present invention will become apparent from the following description with reference to the accompanying drawings which illustrate examples of the present invention.

DESCRIPTION OF THE PREFERRED EMBODIMENTS

Figure 1:
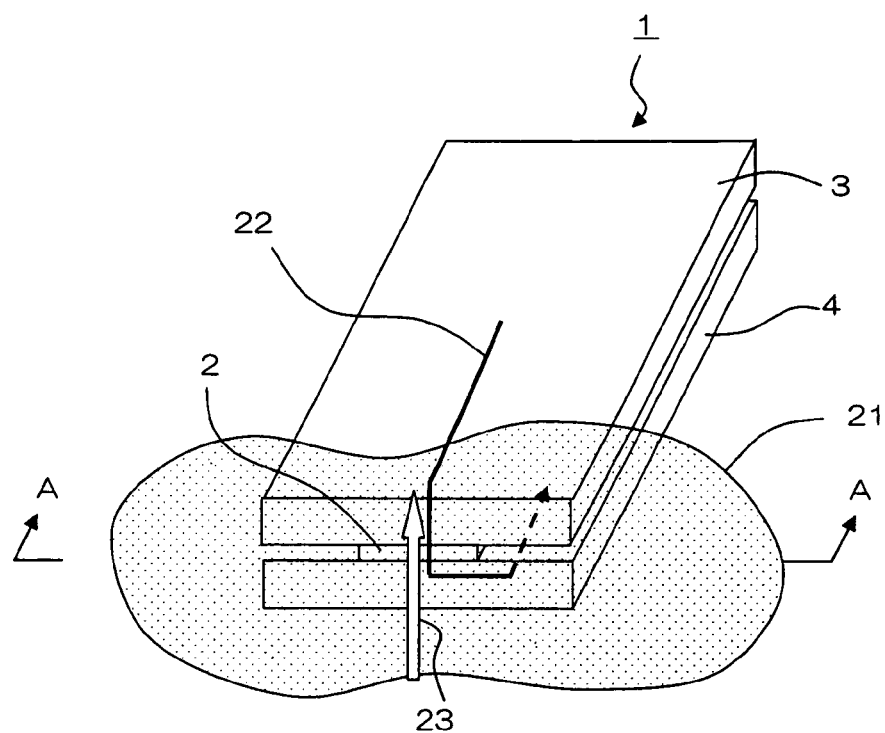
FIG. 1 is a perspective view of a thin-film magnetic head which incorporates a magnetoresistive sensor according to the present invention.

One embodiment of a magnetoresistive sensor (hereinafter referred to as "CPP sensor 2") according to the present invention will be described with reference to the accompanying drawings. FIG. 1 is a partial perspective view of thin-film magnetic head 1 which employs the magnetoresistive sensor of the present invention. Thin-film magnetic head 1 may be a read only head, or a MR/inductive composite head which additionally has a write head portion. CPP sensor 2 is sandwiched between upper electrode/shield 3 and lower electrode/shield 4, with one end facing opposite to recording medium 21. Sense current 22, generated by a voltage applied between upper electrode/shield 3 and lower electrode/shield 4, flows from upper electrode/shield 3 to lower electrode/shield 4 through CPP sensor 2 in the direction of stacking, as indicated by an arrow in FIG. 1. A magnetic field of recording medium 21 opposite to CPP sensor 2 changes as recording medium 21 moves in recording medium moving direction 23. CPP sensor 2 detects this change in magnetic field as a change in electric resistance of sense current 22 obtained by the GMR effect, thereby making it possible to read magnetic information written in each magnetic domain of recording medium 21.

Figure 2:
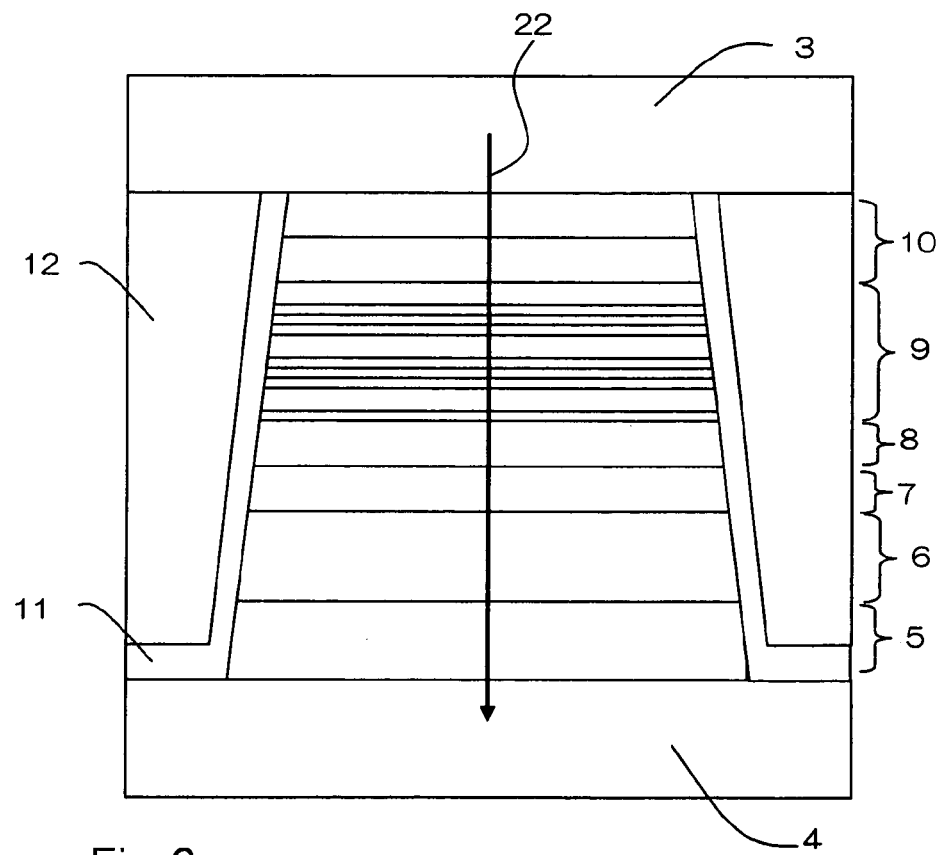
FIG. 2 is a cross-sectional view of magnetoresistive sensor illustrated in FIG. 1, when viewed from an ABS.

FIG. 2 illustrates the configuration of CPP sensor 2 in cross-sectional view taken along an A-A direction in FIG. 1, depicting the layer configuration when viewed from an ABS. For reference, the ABS refers to a surface of thin-film magnetic head 1 which opposes recording medium 21.

CPP sensor 2 comprises lower electrode/shield 4 formed of a NiFe layer, and a stack deposited on lower electrode/shield 4. The stack is composed of buffer layer 5 formed of a Ta/NiFeCr layer, antiferromagnetic layer 6 formed of an IrMn layer, pinned layer 7, spacer layer 8 made of Cu, free layer 9, and cap layer 10 deposited in this order. The Cu layer of spacer layer 8 may contain some additives, and is only required to contain Cu as a main ingredient. A stack portion from buffer layer 5 to cap layer 10 is called an SV film. Cap layer 10 is composed of a Cu layer and a Ru layer which are provided for preventing deterioration of the SV film. Upper electrode/shield 3 made of a NiFe film is formed on cap layer 10. Pinned layer 7 has the magnetization direction fixed with respect to an external magnetic field, while free layer 9 changes the magnetization direction in accordance with the external magnetic field. Hard magnetic layers 12 are formed on both sides of CPP sensor 2, with insulating film 11 therebetween. Hard magnetic layer 12 is a controlling layer for aligning the magnetization direction of each magnetic domain of free layer 9. Insulating layer 11 is formed of $Al_2O_3$, while hard magnetic layer 12 is formed of CoPt, CoCrPt, or the like. The width of a reproduced track is defined by the width of the SV film, and is approximately 0.1 μm or less.

Table 1 shows an exemplary layer configuration of CPP sensor 2. Table 1 shows from the Ta layer of buffer layer 5 in contact with lower electrode/shield 4 toward the Ru layer of cap layer 10 in contact with upper electrode/shield 3 in the order of stacking from below to above.

layer 72 is made of a Ru layer. Inner pinned layer 73 is made, for example, of Co50Fe50/Cu/Co50Fe50 or Co50Fe50. Insertion of a Cu layer into inner pinned layer 73 results in an increase in the number of boundaries to increase the boundary scattering effect, thus increasing the magnetoresistive effect.

In a CPP-GMR sensor, thicker magnetic layers are used to achieve a larger change in magnetoresistance, since bulk scattering contributes more to the magnetoresistive effect. Furthermore, since inner pinned layer 73 and outer pinned layer 71 must be equalized in the amount of magnetization, outer pinned layer 71 consequently is thicker as well. For this reason, pinned layer 7 has an overall thickness of as large as 9 nm.

TABLE 1

| Layer | | | Composition | Thickness(nm) |
|---|---|---|---|---|
| Cap layer10 | | | Ru | 5 |
| | | | Cu | 3 |
| Free layer9 | | Third CoFe alloy layer95 | Co70Fe30 | 1 |
| | Deposited layer | NiFe alloy layer 92b | Ni81Fe19 | 2 |
| | Interim layer 98 | First CoFe alloy layer 93b | Co70Fe30 | 0.5 |
| | | Non-magnetic layer 94 | Cu | 0.2 |
| | | First CoFe alloy layer 93a | Co70Fe30 | 0.5 |
| | | NiFe alloy layer 92a | Ni81Fe19 | 2 |
| | | Second CoFe alloy layer 91 | Co70Fe30 | 1 |
| Spacer layer8 | | | Cu | 3 |
| Pinned Layer7 | | Inner pinned layer 73 | Co50Fe50 | 2 |
| | | | Cu | 0.2 |
| | | | Co50Fe50 | 2 |
| | | Non-magnetic interrim layer72 | Ru | 0.8 |
| | | Outer pinned layer 71 | Co70Fe30 | 4 |
| Antiferromagnetic layer6 | | | IrMn | 7 |
| Buffer layer5 | | | NiFeCr | 5 |
| | | | Ta | 1 |

In this specification, a notation such as A/B/(C/D)x/E/F may be given for representing a layer configuration, where x is an integer. For example, when x=2, this shows that the stack is composed of layer A, layer B, layer C, layer D, layer C, layer D, layer E, and layer F stacked in this order. A notation such as Co70Fe30 represents an atomic percent (the value is given in percent). However, even if a notation such as Co70Fe30 is given, a trace of other elements may be added to such an extent that equivalent magnetic characteristics are ensured, and such a notation does not mean that each layer consists only of the written elements in a strict sense. In the following, pinned layer 7 and free layer 9 will be described in detail based on Table 1.

Pinned layer 7 is a synthetic pinned layer which is composed of magnetic outer pinned layer 71, non-magnetic intermediate layer 72, and magnetic inner pinned layer 73, stacked in this order. In the synthetic pinned layer, outer pinned layer 71 and inner pinned layer 73 are antiferromagnetically coupled by non-magnetic intermediate layer 72 to limit effective magnetization of pinned layer 7, thereby making it possible to maintain a stable magnetization condition.

The magnetic characteristics required for pinned layer 7 include strongly-fixed magnetization and a low sensitivity to an external magnetic field. Therefore, the synthetic pinned layer is first required to exhibit strong exchange coupling of antiferromagnetic layer 6 with outer pinned layer 71, and is further required to exhibit strong antiferromagnetic coupling of outer pinned layer 71 with inner pinned layer 73. To meet these requirements, outer pinned layer 71 is made, for example, of Co50Fe50, and non-magnetic intermediate Free layer 9 is composed of second CoFe alloy layer 91 made of Co70Fe30, NiFe alloy layer 92a made of Ni81Fe19, first CoFe alloy layer 93a made of Co70Fe30, non-magnetic layer 94 made of Cu, first CoFe alloy layer 93b having the same composition and thickness as first CoFe alloy layer 93a, NiFe alloy layer 92b having the same composition and thickness as NiFe alloy layer 92a, and third CoFe alloy layer 95 made of Co70Fe30, stacked in this order to form free layer 9. The Cu layer of non-magnetic layer 94 may contain some additives, and is only required to contain Cu as a main ingredient.

The basic layer configuration of free layer 9 can be denoted, more generally by CoFe/NiFe/CoFe/Cu/(CoFe/NiFe/CoFe/Cu)$_{x-1}$/CoFe/NiFe/CoFe (x is an integer equal to or larger than one), and the foregoing composition corresponds to x equal to one (x=1). Now, description will be made on the basis on which this basic layer configuration was obtained, together with functions of the respective layer.

First, free layer 9 has intermediate stack 98 composed of CoFe/Cu/CoFe (first CoFe alloy layer 93a/non-magnetic layer 94/first CoFe alloy layer 93b). Non-magnetic layer 94, which is a Cu layer, is inserted to increase boundary scattering, thereby increasing the MR ratio. In order to enhance the boundary scattering effect of the Cu layer, the Cu layer is preferably sandwiched by CoFe layers, particularly Co70Fe30 layers. One or a plurality of sets of intermediate stacks 98 may be provided. NiFe layers (NiFe alloy layer 92a, 92b) are disposed on both boundaries of intermediate stack 98 for improving the soft magnetic characteristics of free layer 9. In the present invention, intermediate stack 98 includes Co70Fe30, which is a larger Fe atomic percent, possibly causing exacerbation in the soft magnetic characteristics of free layer 9. NiFe alloy layers 92a, 92b, which are soft magnetic layers, can compensate for the exacerbation in the soft magnetic characteristics.

As a result, stack 99 is formed of NiFe/intermediate stack/NiFe or NiFe/intermediate stack/NiFe/intermediate stack/ . . . /NiFe. This stack 99 is further sandwiched with second CoFe alloy layer 91 and third CoFe alloy layer 95 on both boundaries to complete the aforementioned basic layer configuration. Here, second CoFe alloy layer 91 is intended to enhance the boundary scattering between layer 91 and spacer layer 8 which is a Cu layer. Second CoFe alloy layer 91 and third CoFe alloy layer 95 are both intended to limit diffusion with the Cu layers of spacer layer 8 and cap layer 10, thereby enhancing the bulk scattering. Further, as will be later described, magnetostriction and coercive force can be limited properly by adjusting the composition and thickness of second CoFe alloy layer 91 and third CoFe alloy layer 95.

In this way, free layer 9 can increase the MR ratio through the increased boundary scattering etc., and improve the soft magnetic characteristics through limited magnetostriction as well. It should be noted that while NiFe is used herein for the soft magnetic layer, NiFeCo may be used instead.

Figure 3:
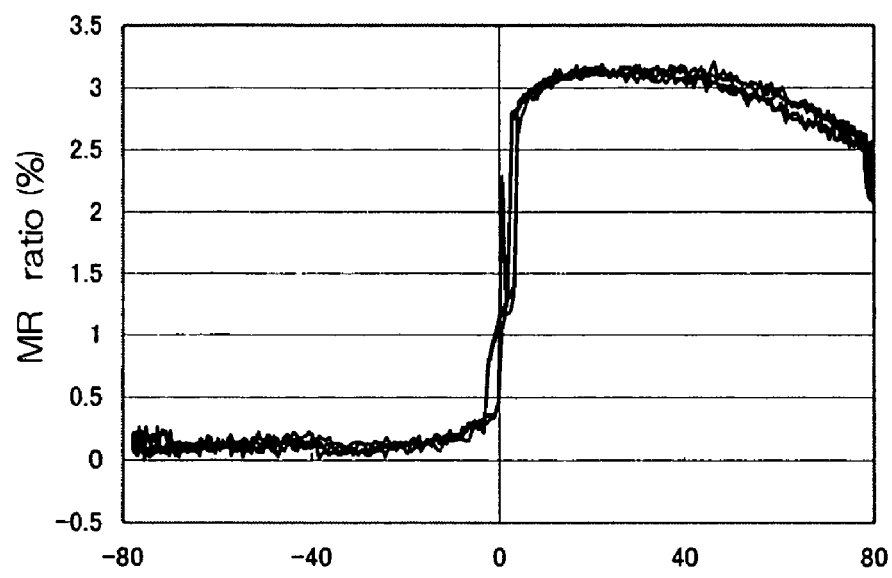
FIG. 3 is a graph showing the result of an exemplary measurement made on a MR ratio of the magnetoresistive sensor according to the present invention.

FIG. 3 shows the result of an exemplary measurement made on the MR ratio of the device shown in Table 1. In the measurement of the MR ratio, a NiFe alloy, the same as the actual device, was used for a lower electrode, and a Cu layer was used for an upper electrode. An SV film was processed by milling, and was embedded with insulating layers made of $Al_2O_3$ on the side surfaces. A sputtering method was used for a deposition process, and the device was annealed at 270° C. for four hours for fixing pinned layer 7 after the deposition. The SV film was formed into the shape of a pillar having a diameter of 0.2 μm. In FIG. 3, the horizontal axis represents an applied magnetic field, and the vertical axis represents the MR ratio. The MR ratio is represented by the ratio of a change in magnetoresistance dR at each magnetic field strength to pillar resistance R when a magnetic field of −79.6 kA/m was applied, i.e., calculated by dR/R. However, in this specification, the MR ratio dR/R is used to mean the highest value of dR/R.

Figure 4:
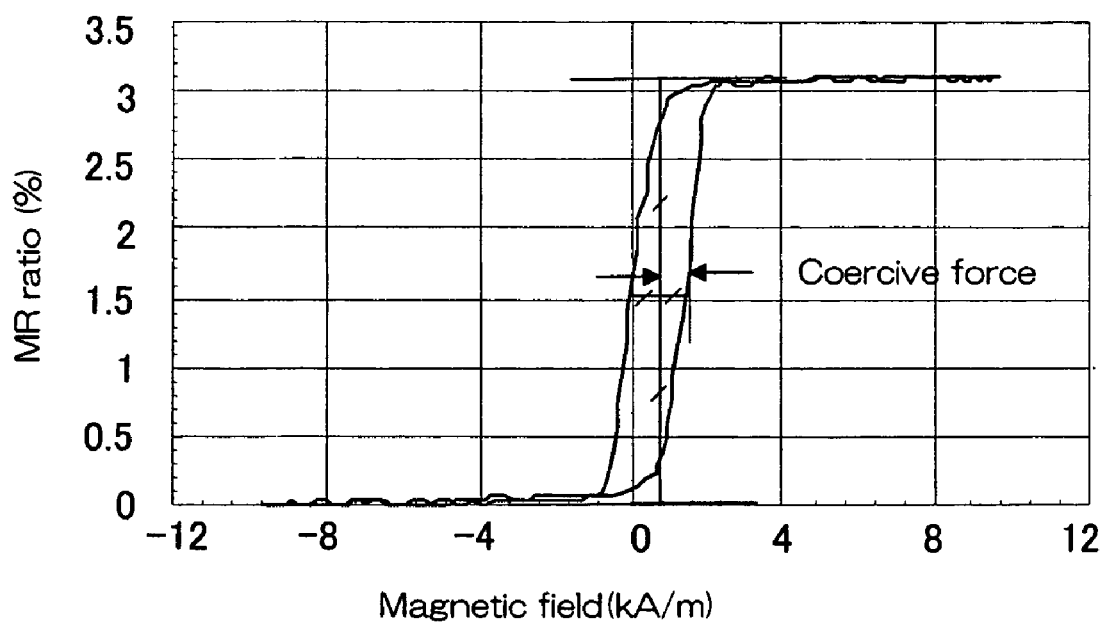
FIG. 4 is a graph showing the result of an exemplary measurement made on a coercive force of the magnetoresistive sensor according to the present invention.

FIG. 4 shows the result of an exemplary measurement made on the coercive force of the device shown in Table 1. The device used in the measurement of the coercive force and magnetostriction was an SV film deposited on a substrate made of silicon oxide. FIG. 4 shows an MR curve when a current was applied to the SV film to flow in the in-plane direction, and the coercive force was estimated from a minor loop of this MR curve. For reference, the coercive force can also be measured by a vibration sample magnetometer (VSM), it is thought that a more accurate coercive force can be estimated from the MR curve. It should be noted that the MR ratio on the vertical axis simply represents reference values. The magnetostriction, in turn, is defined by a change in length dL/L of a sample when it is applied with a magnetic field.

The result of the foregoing measurements reveals that the device shown in Table 1 exhibits a MR ratio of 3.1%, a coercive force of 310 A/m, and magnetostriction of 3.1× $10^{-7}$. These are all satisfactory values, meaning that the magnetoresistive sensor of the present invention satisfies the characteristics required for the free layer, which are a high MR ratio and good soft magnetic characteristics resulting from small magnetostriction, thereby realizing an output of high quality.

While the layer configuration shown in Table 1 is one of preferred embodiments in the magnetoresistive sensor of the present invention as described above, the layer configuration is not limited to that shown in Table 1. The following seven investigations were next made in order to pursue a preferred range of the layer configuration.

First Investigation: the presence or absence of first CoFe alloy layers 93a, 93b, and non-magnetic layer 94;

Second Investigation: a preferred range of a Co atomic percent for first CoFe alloy layers 93a, 93b, second CoFe alloy layer 91, and third CoFe alloy layer 95;

Third Investigation: a preferred range of a Ni atomic percent for NiFe alloy layers 92a, 92;

Fourth Investigation: a preferred range of the thickness for first CoFe alloy layers 93, 93b;

Fifth Investigation: a preferred range of the thickness for second CoFe alloy layer 91 and third CoFe alloy layer 95;

Sixth Investigation: a preferred range of the thickness for NiFe alloy layers 92a, 92b; and Seventh Investigation: a preferred range of the thickness for non-magnetic layer 94.

The results of the investigations will be described below in order. In the following discussion, a "base case" refers to the layer configuration shown in Table 1. The layer configuration other than the free layer is the same as the layer configuration shown in Table 1, so that description thereon is omitted.

(First Investigation) Presence or Absence of First CoFe Alloy Layers 93a, 93b and Non-Magnetic Layer 94:

First, the base case was compared with a layer configuration without intermediate stack 98 in order to investigate the effect of first CoFe alloy layers 93a, 93b and non-magnetic layer 94, i.e., intermediate stack 98. In either case, the total thickness of free layer 9 was chosen to be 7 nm. Table 2 shows the result of the investigation. It was confirmed that an inserted Cu layer (inserted intermediate stack 98) resulted in a significant improvement on a change in magnetoresistance. In the subsequent investigations, the layer configuration of the free layer with inserted intermediate stack 98 was treated as the base for optimizing the composition and thickness from a viewpoint of the change in magnetoresistance, magnetostriction, and coercive force.

TABLE 2

|  | Layer | Composition | Thickness(nm) | |
| --- | --- | --- | --- | --- |
| Cap layer10 |  | Ru | 5 | |
|  |  | Cu | 3 | |
| Free layer9 | Third CoFe alloy layer95 | Co70Fe30 | 1 | |
|  | NiFe alloy layer 92b | Ni81Fe19 | 2 | 0 |
|  | First CoFe alloy layer 93b | Co70Fe30 | 0.5 | 0 |
|  | Non-magnetic layer 94 | Cu | 0.2 | 0 |

TABLE 2-continued

| | Layer | Composition | Thickness(nm) | |
|---|---|---|---|---|
| | First CoFe alloy layer 93a | Co70Fe30 | 0.5 | 0 |
| | NiFe alloy layer 92a | Ni81Fe19 | 2 | 5 |
| | Second CoFe alloy layer 91 | Co70Fe30 | 1 | |
| Spacer layer8 | | Cu | 3 | |
| Pinned Layer7 | Inner pinned layer 73 | Co50Fe50 | 2 | |
| | | Cu | 0.2 | |
| | | Co50Fe50 | 2 | |
| | Non-magnetic interrim layer72 | Ru | 0.8 | |
| | Outer pinned layer 71 | Co70Fe30 | 4 | |
| Antiferromagnetic layer6 | | IrMn | 7 | |
| Buffer layer5 | | NiFeCr | 5 | |
| | | Ta | 1 | |
| MR ratio(%) | | | 3.1 Base case | 2.1 |

(Second Investigation) Preferred Range of Co Atom Fraction for First CoFe Alloy Layers 93a, 93b, Second CoFe Alloy Layer 91, Third CoFe Alloy Layer 95:

First, in order to investigate the influence exerted on the MR ratio by the Co atomic percent of all CoFe layers in free layer 9, the MR ratio was measured while changing the Co atomic percents of all CoFe layers (first CoFe alloy layers 93a, 93b, second CoFe alloy layer 91, and third CoFe alloy layer 95). Table 3 shows the result of the measurement. The MR ratio is more advantageous when the Co atomic percent is lower and the Fe atomic percent is higher.

between the Co atomic percent of second CoFe alloy layer 91 and the change in magnetoresistance has a similar tendency to Table 3, leading to a confirmation that the Co atomic percent of second CoFe alloy layer 91 largely contributes to the change in magnetoresistance.

As will be appreciated from the foregoing investigation, the Co atomic percent of first CoFe alloy layers 93a, 93b, second CoFe alloy layer 91, and third CoFe alloy layer 95 without serious problems in practice may be 90% or less but is preferably 75% or less. It is also important to limit the Co

TABLE 3

| Layer | | Composition | | | | |
|---|---|---|---|---|---|---|
| Free layer9 | Third CoFe alloy layer95 | Co90Fe10 | Co75Fe25 | Co70Fe30 | Co65Fe35 | Co50Fe50 |
| | NiFe alloy layer 92b | | | Ni81Fe19 | | |
| | First CoFe alloy layer 93b | Co90Fe10 | Co75Fe25 | Co70Fe30 | Co65Fe35 | Co50Fe50 |
| | Non-magnetic layer 94 | | | Cu | | |
| | First CoFe alloy layer 93a | Co90Fe10 | Co75Fe25 | Co70Fe30 | Co65Fe35 | Co50Fe50 |
| | NiFe alloy layer 92a | | | Ni81Fe19 | | |
| | Second CoFe alloy layer 91 | Co90Fe10 | Co75Fe25 | Co70Fe30 | Co65Fe35 | Co50Fe50 |
| MR ratio(%) | | 2.4 | 3 | 3.1 Base case | 3.1 | 3.3 |

Among the CoFe layers in free layer 9, deemed to particularly contribute to the change in magnetoresistance is second CoFe alloy layer 91 which is in contact with non-magnetic intermediate magnetic layer 8. Therefore, the MR ratio was next measured in a similar manner while changing only the Co atomic percent of second CoFe alloy layer 91. In this investigation, unless otherwise noted, the thickness of each layer was the same as that of the "base case." Table 4 shows the result of the measurements. The relationship atomic percent of, in particular, CoFe alloy layer 91 within the range of Co atomic percent mentioned above from a viewpoint of a contribution to the MR ratio.

In the foregoing compositions, Co90Fe10 is an only layer in fcc (face-centered cubic) configuration, whereas the remaining compositions are in bcc (body-centered cubic) configuration. It should be understood that a higher MR ratio can be provided by using CoFe layers in bcc configuration.

TABLE 4

| Layer | | Composition | | | | |
|---|---|---|---|---|---|---|
| Free layer9 | Third CoFe alloy layer95 | | | Co70Fe30 | | |
| | NiFe alloy layer 92b | | | Ni81Fe19 | | |
| | First CoFe alloy layer 93b | | | Co70Fe30 | | |
| | Non-magnetic layer 94 | | | Cu | | |
| | First CoFe alloy layer 93a | | | Co70Fe30 | | |
| | NiFe alloy layer 92a | | | Ni81Fe19 | | |
| | Second CoFe alloy layer 91 | Co90Fe10 | Co75Fe25 | Co70Fe30 | Co65Fe35 | Co50Fe50 |
| MR ratio(%) | | 2.6 | 3 | 3.15 Base case | 3.1 | 3.2 |

As mentioned above, important for free layer 9 are the soft magnetic characteristics for improved sensitivity and stability of a head as well as for the MR ratio. In this respect, the coercive force and magnetostriction were measured while changing the Co atomic percent of each CoFe layer in free layer 9 in a similar manner. To begin with, as a first case, the composition of the CoFe layers was chosen to be Co90Fe10, except for second CoFe alloy layer 91 which is adjacent to spacer layer 8. The Co atomic percent of second CoFe alloy layer 91 was kept unchanged at 70%. This is intended to avoid a degraded MR ratio based on the foregoing results of the investigations (Table 4 in particular). Next, as a second case, the composition of second CoFe alloy layer 91 was chosen to be Co50Fe50. The Co atomic percent of the CoFe layers other than second CoFe alloy layer 91 was kept unchanged at 70%. This is intended to avoid degraded coercive force and magnetostriction.

Table 5 shows the result of the measurement. It can be seen from Table 5 that the Co atomic percent of approximately 70% is preferred from a viewpoint of the coercive force and magnetostriction. Good characteristics also can be ensured for the Co atomic percent of 90%. However, the soft magnetic characteristics are degraded when the Co atomic percent is 50%.

90% or less, more preferably 75% or less. Its lower limit value is defined by the coercive force and magnetostriction shown in Table 5, preferably should not be reduced to less than 50%. For limiting the coercive force and magnetostriction to some degree, the lower limit value of the Co atomic percent is preferably approximately 65% or more. Taking all the results shown in Tables 3-5 into consideration, the most preferable value of Co atomic percent is determined to be near 70%.

(Third Investigation) Preferred Range of Ni Atom Fraction for NiFe Alloy Layers 92a, 92b:

Next, in order to investigate the influence exerted on the coercive force and magnetostriction by the Ni atomic percent of NiFe alloy layers 92a, 92b in free layer 9, the coercive force and magnetostriction were measured while changing the Ni atomic percent of NiFe alloy layers 92a, 92b. The thickness of each layer was the same as the "base case." Table 6 shows the result of the measurements. Basically, the soft magnetic characteristics are satisfactory when the composition is near Ni81Fe19, causing few change in both the magnetostriction and coercive force. The Ni atomic

TABLE 5

| Layer | | Composition | | |
|---|---|---|---|---|
| Free layer9 | Third CoFe alloy layer95 | Co90Fe10 | | Co70Fe30 |
| | NiFe alloy layer 92b | | Ni81Fe19 | |
| | First CoFe alloy layer 93b | Co90Fe10 | | Co70Fe30 |
| | Non-magnetic layer 94 | | Cu | |
| | First CoFe alloy layer 93a | Co90Fe10 | | Co70Fe30 |
| | NiFe alloy layer 92a | | Ni81Fe19 | |
| | Second CoFe alloy layer 91 | Co70Fe30 | | Co50Fe50 |
| Coercive force(A/m) | | 358 | 310 | 3980 |
| Magneto striction | | −3.3E−07 | −3.1E−07 | 6.1E−06 |
| | | Case 1 | Base case | Case 2 |

From the foregoing investigations, the Co atomic percent of each CoFe layer (first CoFe alloy layers 93a, 93b, second CoFe alloy layer 91, and third CoFe alloy layer 95) in free layer 9 has an upper limit value defined by the change in magnetoresistance shown in Tables 3, 4, and is preferably percent exceeding 90% causes the magnetostriction to be a large negative value, while the Ni atomic percent below 70% causes the coercive force to increase, so that it is preferable that the Ni atomic percent is in a range of 70% to 90% and particularly in a range of 79 to 83%.

TABLE 6

| Layer | | Composition | | | | |
|---|---|---|---|---|---|---|
| Free layer9 | Third CoFe alloy layer95 | | | Co70Fe30 | | |
| | NiFe alloy layer 92b | Ni90Fe10 | Ni83Fe17 | Ni81Fe19 | Ni79Fe21 | Ni70Fe30 |
| | First CoFe alloy layer 93b | | | Co70Fe30 | | |
| | Non-magnetic layer 94 | | | Cu | | |
| | First CoFe alloy layer 93a | | | Co70Fe30 | | |
| | NiFe alloy layer 92a | Ni90Fe10 | Ni83Fe17 | Ni81Fe19 | Ni79Fe21 | Ni70Fe30 |
| | Second CoFe alloy layer 91 | | | Co70Fe30 | | |
| Coercive force(A/m) | | 358 | 295 | 310 | 318 | 836 |
| Magneto striction | | −1.7E−06 | −5.2E−07 | −3.1E−07 | −2.9E−07 | 1.8E−06 |
| | | | | Base case | | |

(Fourth Investigation) Preferred Range of Thickness for First CoFe Alloy Layers 93a, 93b:

Next, in order to investigate the influence exerted on the MR ratio by the thickness of first alloy layers 93a, 93b, the MR ratio was measured while changing the thickness of first CoFe alloys 93a, 93b by the same amount. Table 7 shows the result of the measurement. The MR ratio is relatively insensitive to the thickness, but hardly increases when the thickness exceeds 1 nm. On the other hand, since it is preferable that the product of saturated magnetization and thickness of the free layer is smaller for a higher sensitivity, it is preferable that the free layer has a smaller thickness with a similar MR ratio. From the foregoing, it is preferable that the thickness has an upper limit value of approximately 1 nm. A lower limit value, in turn, was chosen to be approximately 0.2 nm from a viewpoint of the repeatability of fabrication of layers.

First, in order to investigate the influence exerted on the MR ratio by the thickness of second CoFe alloy layer 91, the MR ratio was measured while changing the thickness of second CoFe alloy layer 91. Table 8 shows the result of the measurement. The MR ratio is relatively insensitive to the thickness, but gradually increases as the thickness is larger. However, an increase of the thickness from 1 nm to 1.5 nm hardly causes a change in the MR ratio, so that there is not significant meaning in the thickness set to be 1.5 nm or larger. Like the fourth investigation, since the free layer should have a smaller thickness with the same MR ratio, it is preferable that the upper limit value of the thickness is 1.5 nm. On the other hand, the MR ratio is lower as the thickness is smaller, and largely decreases when the thickness is 0.3 nm. Therefore, the lower limit value of the thickness is preferably 0.5 nm.

TABLE 7

| Layer | | Composition | Thickness(nm) | | | | |
|---|---|---|---|---|---|---|---|
| Cap layer 10 | | Ru | 5 | | | | |
| | | Cu | 3 | | | | |
| Free layer | Third CoFe alloy layer95 | Co70Fe30 | 1 | | | | |
| | NiFe alloy layer 92b | Ni81Fe19 | 2 | | | | |
| | First CoFe alloy layer 93b | Co70Fe30 | 0.2 | 0.3 | 0.5 | 1 | 1.5 |
| | Non-magnetic layer 94 | Cu | 0.2 | | | | |
| | First CoFe alloy layer 93a | Co70Fe30 | 0.2 | 0.3 | 0.5 | 1 | 1.5 |
| | NiFe alloy layer 92a | Ni81Fe19 | 2 | | | | |
| | Second CoFe alloy layer 91 | Co70Fe30 | 1 | | | | |
| Spacer layer8 | | Cu | 3 | | | | |
| Pinned Layer | Inner pinned layer 73 | Co50Fe50 | 2 | | | | |
| | | Cu | 0.2 | | | | |
| | | Co50Fe50 | 2 | | | | |
| | Non-magnetic interrim layer72 | Ru | 0.8 | | | | |
| | Outer pinned layer 71 | Co70Fe30 | 4 | | | | |
| Antiferromagnetic layer6 | | IrMn | 7 | | | | |
| Buffer layer5 | | NiFeCr | 5 | | | | |
| | | Ta | 1 | | | | |
| MR ratio(%) | | | 2.8 | 2.9 | 3.1 | 3.3 | 3.3 |
| | | | | | Base case | | |

(Fifth Investigation) Preferred Range of Thickness for Second CoFe Alloy Layer 91 and Third CoFe Alloy Layer 95:

TABLE 8

| Layer | | Composition | Thickness(nm) | | | | |
|---|---|---|---|---|---|---|---|
| Cap layer10 | | Ru | 5 | | | | |
| | | Cu | 3 | | | | |
| Free layer | Third CoFe alloy layer95 | Co70Fe30 | 1 | | | | |
| | NiFe alloy layer 92b | Ni81Fe19 | 2 | | | | |
| | First CoFe alloy layer 93b | Co70Fe30 | 0.5 | | | | |
| | Non-magnetic layer 94 | Cu | 0.2 | | | | |
| | First CoFe alloy layer 93a | Co70Fe30 | 0.5 | | | | |
| | NiFe alloy layer 92a | Ni81Fe19 | 2 | | | | |
| | Second CoFe alloy layer 91 | Co70Fe30 | 0.3 | 0.5 | 1 | 1.5 | 2 |
| Spacer layer8 | | Cu | 3 | | | | |
| Pinned Layer | Inner pinned layer 73 | Co50Fe50 | 2 | | | | |
| | | Cu | 0.2 | | | | |
| | | Co50Fe50 | 2 | | | | |
| | Non-magnetic interrim layer72 | Ru | 0.8 | | | | |
| | Outer pinned layer 71 | Co70Fe30 | 4 | | | | |
| Antiferromagnetic layer6 | | IrMn | 7 | | | | |
| Buffer layer5 | | NiFeCr | 5 | | | | |
| | | Ta | 1 | | | | |
| MR ratio(%) | | | 2.4 | 2.9 | 3.1 | 3.3 | 3.3 |
| | | | | | Base case | | |

Similarly, in order to investigate the influence exerted on the MR ratio by the thickness of third CoFe alloy layer 95, the MR ratio was measured while changing the thickness of third CoFe alloy layer 95. Table 9 shows the result of the measurement. The MR ratio is relatively insensitive to the thickness, so that there is little need for increasing the thickness for the reason set forth above.

as the thickness of second CoFe alloy layer 91 is increased to 1.5 nm, the coercive force increases, however a relatively small coercive force can still be maintained.

The magnetostriction, on the other hand, is largely affected by the thicknesses of second CoFe alloy layer 91 and third CoFe alloy layer 95. When both of these layers have a thickness of 0.5 nm, the magnetostriction presents a

TABLE 9

| Layer | | Composition | Thickness(nm) | | | | |
|---|---|---|---|---|---|---|---|
| Cap layer10 | | Ru | 5 | | | | |
| | | Cu | 3 | | | | |
| Free layer | Third CoFe alloy layer95 | Co70Fe30 | 0.5 | 1 | 1.5 | 2 | 2.5 |
| | NiFe alloy layer 92b | Ni81Fe19 | 2 | | | | |
| | First CoFe alloy layer 93b | Co70Fe30 | 0.5 | | | | |
| | Non-magnetic layer 94 | Cu | 0.2 | | | | |
| | First CoFe alloy layer 93a | Co70Fe30 | 0.5 | | | | |
| | NiFe alloy layer 92a | Ni81Fe19 | 2 | | | | |
| | Second CoFe alloy layer 91 | Co70Fe30 | 1 | | | | |
| Spacer layer8 | | Cu | 3 | | | | |
| Pinned Layer | Inner pinned layer 73 | Co50Fe50 | 2 | | | | |
| | | Cu | 0.2 | | | | |
| | | Co50Fe50 | 2 | | | | |
| | Non-magnetic interrim layer72 | Ru | 0.8 | | | | |
| | Outer pinned layer 71 | Co70Fe30 | 4 | | | | |
| Antiferromagnetic layer6 | | IrMn | 7 | | | | |
| Buffer layer5 | | NiFeCr | 5 | | | | |
| | | Ta | 1 | | | | |
| MR ratio(%) | | | 3 | 3.1 Base case | 3.1 | 3.1 | 3.1 |

Bearing the foregoing in mind, in order to investigate a preferred range of the thickness from a viewpoint of the soft magnetic characteristics, the coercive force and magnetostriction were next measured with the thickness chosen to be 0.5 nm for either or both of second CoFe alloy layer 91 and third CoFe alloy layer 95. An additional investigation is also made for second CoFe alloy layer 91 with the thickness chosen to be 1.5 nm. Table 10 shows the result of the measurement.

The coercive force tends to decrease as the thicknesses of second CoFe alloy layer 91 and third CoFe alloy layer 95 become smaller than that of the base case. On the other hand, relatively large negative value, so that a further reduction in thickness is not preferable. However, if the thickness of at least either one is chosen to be 1 nm, it is possible to reduce the absolute value of magnetostriction.

From the foregoing investigation, it is practically feasible that the thicknesses of second CoFe alloy layer 91 and third CoFe alloy layer 95 are chosen in a range of 0.5 nm to 1.5 nm. However, it is preferable that at least one of these layers has a thickness of approximately 1 nm, and it is more preferable that both of these layers have a thickness of more or less 1 nm.

TABLE 10

| Layer | | Composition | Thickness(nm) | | | | |
|---|---|---|---|---|---|---|---|
| Cap layer 10 | | Ru | 5 | | | | |
| | | Cu | 3 | | | | |
| Free layer | Third CoFe alloy layer95 | Co70Fe30 | 1 | 0.5 | 0.5 | 1 | 1 |
| | NiFe alloy layer 92b | Ni81Fe19 | 2 | | | | |
| | First CoFe alloy layer 93b | Co70Fe30 | 0.5 | | | | |
| | Non-magnetic layer 94 | Cu | 0.2 | | | | |
| | First CoFe alloy layer 93a | Co70Fe30 | 0.5 | | | | |
| | NiFe alloy layer 92a | Ni81Fe19 | 2 | | | | |
| | Second CoFe alloy layer 91 | Co70Fe30 | 1 | 0.5 | 1 | 0.5 | 1.5 |
| Spacer layer8 | | Cu | 3 | | | | |
| Pinned Layer | Inner pinned layer 73 | Co50Fe50 | 2 | | | | |
| | | Cu | 0.2 | | | | |
| | | Co50Fe50 | 2 | | | | |
| | Non-magnetic interrim layer72 | Ru | 0.8 | | | | |

TABLE 10-continued

| Layer | | Composition | Thickness(nm) | | | | |
|---|---|---|---|---|---|---|---|
| | Outer pinned layer 71 | Co70Fe30 | 4 | | | | |
| Antiferromagnetic layer6 | | IrMn | 7 | | | | |
| Buffer layer5 | | NiFeCr | 5 | | | | |
| | | Ta | 1 | | | | |
| Coercive force(A/m) | | 41185 | 310 | 239 | 271 | 279 | 517 |
| Magneto striction | | −1.7E−06 | −3.1E−07 | 2.9E−06 | 1.3E−06 | 1.2E−06 | −7.0E−07 |
| | | | Base case | | | | |

(Sixth Investigation) Preferred Range of Thickness for NiFe Alloy Layers 92a, 92b:

Next, in order to investigate the influence exerted on the MR ratio by the thickness of NiFe alloy layers 92a, 92b, the MR ratio was measured while changing the thickness of NiFe alloy layers 92a, 92b by the same amount. Table 11 shows the result of the measurement. While the MR ratio is relatively insensitive to the thickness of the NiFe layers, the thickness below 1 nm is not preferable in regard to the MR ratio. In addition, since the soft magnetic characteristics of the free layer depend on the NiFe layers as mentioned above, the NiFe layers preferably should not be reduced in thickness. Therefore, the lower limit value of the thickness is preferably approximately 1.5 nm. On the other hand, as the thickness is increased to near 3.5 nm, the MR ratio decreases. This is thought because the excessively thick magnetic layer fails to hold the spin of conduction electrons, causing a reduction in the MR ratio. Further, with a similar MR ratio, it is preferable that the free layer has a smaller thickness. Bearing in mind these considerations, the upper limit value of the thickness is preferably approximately 3 nm.

(Seventh Investigation) Preferred Range of Thickness for Non-Magnetic Layer 94:

Next, in order to investigate the influence exerted on the MR ratio by the thickness of non-magnetic layer 94, the MR ratio was measured while changing the thickness of non-magnetic layer 94. Table 12 shows the result of the measurement. While the MR ratio is relatively insensitive to the thickness of non-magnetic layer 94, a thickness of approximately 0.2 nm is suitable for non-magnetic layer 94 from a viewpoint of the MR ratio.

From the foregoing, a range of layer configurations was confirmed for the magnetoresistive sensor of the present invention which excels in all of the MR ratio, coercive force, and magnetostriction of the free layer.

TABLE 11

| Layer | | Composition | Thickness(nm) | | | | | |
|---|---|---|---|---|---|---|---|---|
| Cap layer10 | | Ru | 5 | | | | | |
| | | Cu | 3 | | | | | |
| Free layer | Third CoFe alloy layer95 | Co70Fe30 | 1 | | | | | |
| | NiFe alloy layer 92b | Ni81Fe19 | 1 | 1.5 | 2 | 2.5 | 3 | 3.5 |
| | First CoFe alloy layer 93b | Co70Fe30 | 0.5 | | | | | |
| | Non-magnetic layer 94 | Cu | 0.2 | | | | | |
| | First CoFe alloy layer 93a | Co70Fe30 | 0.5 | | | | | |
| | NiFe alloy layer 92a | Ni81Fe19 | 1 | 1.5 | 2 | 2.5 | 3 | 3.5 |
| | Second CoFe alloy layer 91 | Co70Fe30 | 1 | | | | | |
| Spacer layer8 | | Cu | 3 | | | | | |
| Pinned Layer | Inner pinned layer 73 | Co50Fe50 | 2 | | | | | |
| | | Cu | 0.2 | | | | | |
| | | Co50Fe50 | 2 | | | | | |
| | Non-magnetic interrim layer72 | Ru | 0.8 | | | | | |
| | Outer pinned layer 71 | Co70Fe30 | 4 | | | | | |
| Antiferromagnetic layer6 | | IrMn | 7 | | | | | |
| Buffer layer5 | | NiFeCr | 5 | | | | | |
| | | Ta | 1 | | | | | |
| MR ratio(%) | | | 2.7 | 2.9 | 3.1 | 3.1 | 3.2 | 3.1 |
| | | | | | Base case | | | |

TABLE 12

| Layer | | Composition | Thickness(nm) | | |
|---|---|---|---|---|---|
| Cap layer10 | | Ru | | 5 | |
| | | Cu | | 3 | |
| Free layer | Third CoFe alloy layer95 | Co70Fe30 | | 1 | |
| | NiFe alloy layer 92b | Ni81Fe19 | | 2 | |
| | First CoFe alloy layer 93b | Co70Fe30 | | 0.5 | |
| | Non-magnetic layer 94 | Cu | 0.1 | 0.2 | 0.3 |
| | First CoFe alloy layer 93a | Co70Fe30 | | 0.5 | |
| | NiFe alloy layer 92a | Ni81Fe19 | | 2 | |
| | Second CoFe alloy layer 91 | Co70Fe30 | | 1 | |
| Spacer layer8 | | Cu | | 3 | |
| Pinned Layer | Inner pinned layer 73 | Co50Fe50 | | 2 | |
| | | Cu | | 0.2 | |
| | | Co50Fe50 | | 2 | |
| | Non-magnetic interrim layer72 | Ru | | 0.8 | |
| | Outer pinned layer 71 | Co70Fe30 | | 4 | |
| Antiferromagnetic layer6 | | IrMn | | 7 | |
| Buffer layer5 | | NiFeCr | | 5 | |
| | | Ta | | 1 | |
| MR ratio(%) | | | 2.8 | 3.1 | 2.9 |
| | | | | Base case | |

Finally, a CPP head was manufactured on a trial basis according to the layer configuration (see Table 1) of the base case to evaluate the characteristics as a device. A CPP head without first CoFe alloy layers 93a, 93b and non-magnetic layer 94, used in the first investigation, was manufactured on a trial basis as Comparative Example 1. Also, a CPP head was manufactured on a trial basis as Comparative Example 2 with the Co atomic percent chosen to be 50% for second CoFe alloy layer 91, used in the second investigation. Each CPP head had a junction size of 0.1 μm×0.1 μm, insulating layer 11 made of an $Al_2O_3$ layer of 10 nm thick, and hard magnetic layer 12 made of a CoCrPt layer of 30 nm thick. A sense current was chosen to be 5 mA during measurements. Items under evaluation included the output power of isolated read pulse, and the probability of occurrence of Barkhausen noise normalized by the value in the base case.

Table 13 shows the result. Comparative Example 1 is largely inferior in output power, while Comparative Example 2 exhibits a high probability of occurrence of Barkhausen noise and is therefore problematic in regard to the stability of the head. These tendencies fairly coincide with the results of the investigations which were made for the SV film. It was confirmed that the layer configuration for the SV film according to the present invention can provide good read characteristics when it is assembled into a head.

TABLE 13

| | | Base case | | Comparison 1 | | Comparison 2 | |
|---|---|---|---|---|---|---|---|
| Layer | | Composition | Thickness(nm) | Composition | Thickness(nm) | Composition | Thickness(nm) |
| Cap layer10 | | Ru | 5 | Same as base case | | Same as base case | |
| Free layer | Third CoFe alloy layer95 | Cu | 3 | | | | |
| | NiFe alloy layer 92b | Co70Fe30 | 1 | Same as base case | | Same as base case | |
| | First CoFe alloy layer 93b | Ni81Fe19 | 2 | Ni81Fe19 | 0 | | |
| | Non-magnetic layer 94 | Co70Fe30 | 0.5 | Co70Fe30 | 0 | | |
| | First CoFe alloy layer 93a | Cu | 0.2 | Cu | 0 | | |
| | NiFe alloy layer 92a | Co70Fe30 | 0.5 | Co70Fe30 | 0 | | |
| | Second CoFe alloy layer 91 | Ni81Fe19 | 2 | Ni81Fe19 | 5 | | |
| Spacer layer8 | | Co70Fe30 | 1 | Same as base case | | Co50Fe50 | 1 |
| Pinned Layer | Inner pinned layer 73 | Cu | 3 | Same as base case | | Same as base case | |
| | | Co50Fe50 | 2 | | | Same as base case | |
| | | Cu | 0.2 | | | | |
| | Non-magnetic interrim layer72 | Co50Fe50 | 2 | Same as base case | | | |
| | Outer pinned layer 71 | Ru | 0.8 | | | | |
| Antiferromagnetic layer6 | | Co70Fe30 | 4 | | | | |
| Buffer layer5 | | IrMn | 7 | Same as base case | | Same as base case | |
| | | NiFeCr | 5 | Same as base case | | Same as base case | |
| MR ratio(%) | | Ta | 1 | | | | |
| Output power(mV) | | | 0.9 | | 0.63 | | 0.95 |
| Normalized probability of Barkhausen noise | | | 1 | | 1.1 | | 9.5 |

Figure 5:
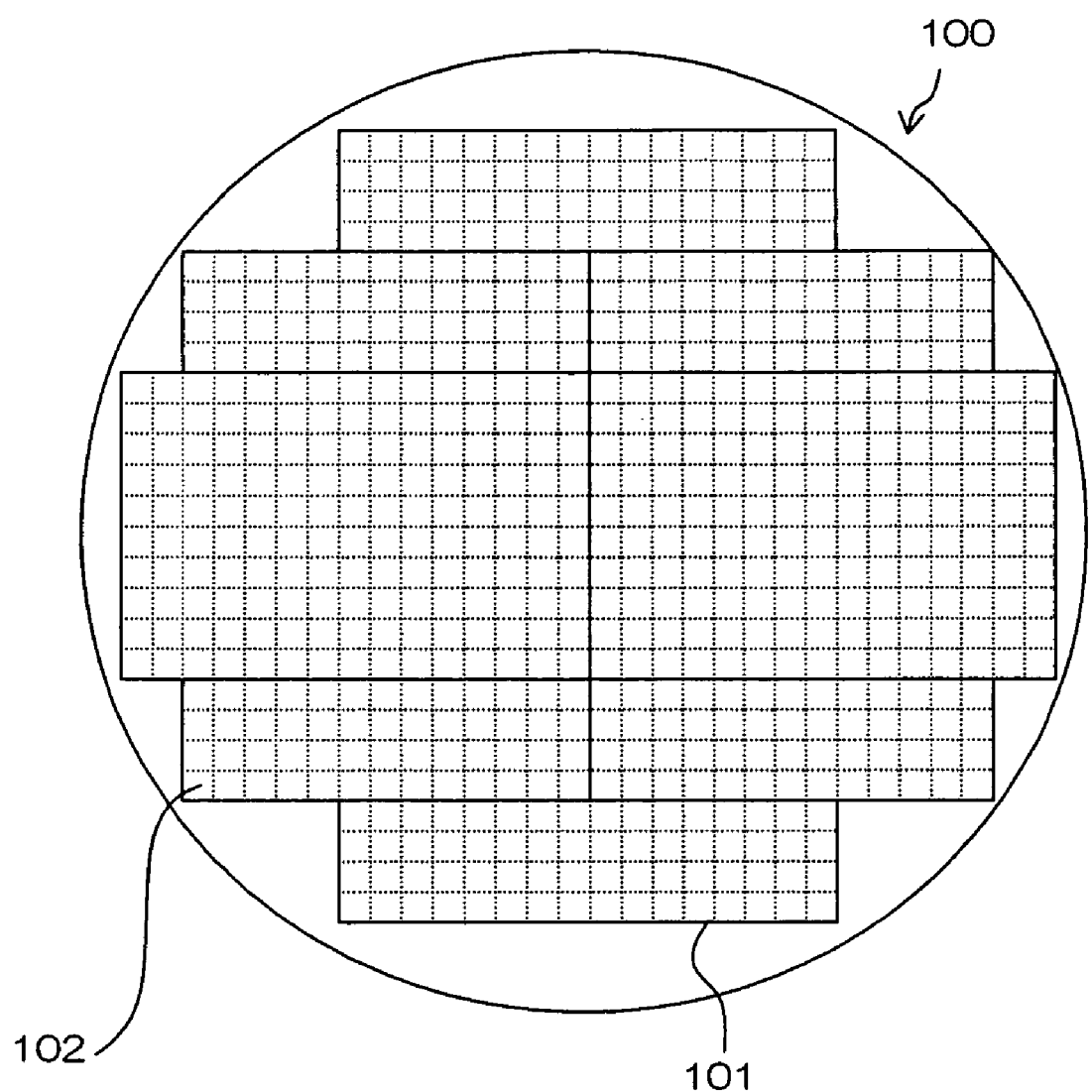
FIG. 5 is a plan view of a wafer associated with manufacturing of a thin-film magnetic head which incorporates a magnetoresistive sensor according to the present invention.

Next, explanation regards a wafer for fabricating a thin-film magnetic head having the above-described CPP sensor 2 as a head element. FIG. 5 is a schematic plan view of the wafer. Wafer 100 is partitioned into a plurality of thin-film magneto-electric transducer assemblies 101. Each thin-film magneto-electric transducer assembly 101 includes thin-film magneto-electric transducers 102, in each of which CPP sensor 2 is stacked, and serves as a work unit in the polishing process of the ABS. Cut margins (not shown) are provided for cutting between thin-film magneto-electric transducer assemblies 101 and between thin-film magneto-electric transducers 102.

Figure 6:
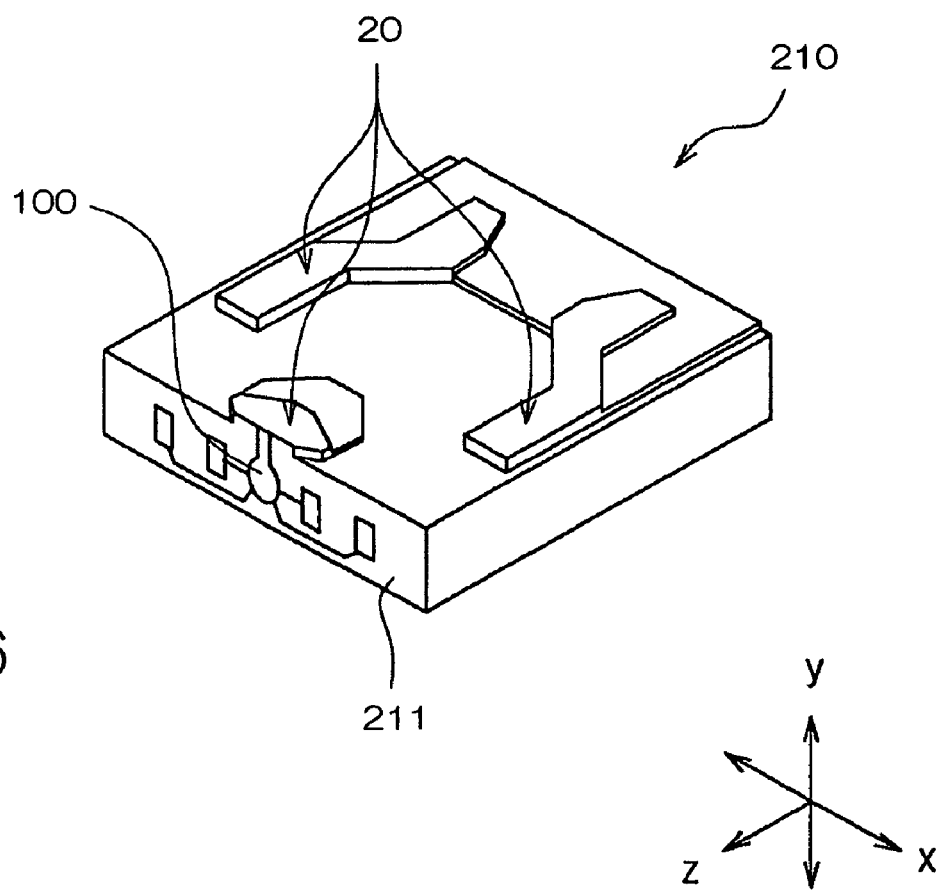
FIG. 6 is a perspective view illustrating a slider included in a head gimbal assembly which incorporates a magnetoresistive sensor according to the present invention.

Explanation next regards a head gimbal assembly and a hard disk device having CPP sensor 2 as a head sensor. Referring to FIG. 6, explanation is first presented regarding slider 210 included in the head gimbal assembly. In the hard disk device, slider 210 is arranged opposite to a hard disk, which is a rotarily-driven disciform storage medium. Slider 210 is provided with body 211 mainly formed of substrate 1 and overcoat layer 17 shown in FIG. 6. Body 211 has a substantially hexahedral form. One surface of the six surfaces of body 211 is positioned opposite to the hard disk, with air bearing surface 20 being formed on the surface. When the hard disk rotates moving in the z direction in FIG. 6, the airflow that passes between the hard disk and slider 210 creates a dynamic lift, which is applied to slider 210 downward in the y direction of FIG. 6. Slider 210 is lifted away from the surface of the hard disk by this dynamic lift. For reference, the x direction in FIG. 6 is the transverse direction of the track of the hard disk. In the proximity to the trailing edge of slider 210 on the outlet side of the airflow (the end portion at the lower left in FIG. 6), thin-film magnetic head 100 is formed, with CPP sensor 2 employed as a head sensor.

Figure 7:
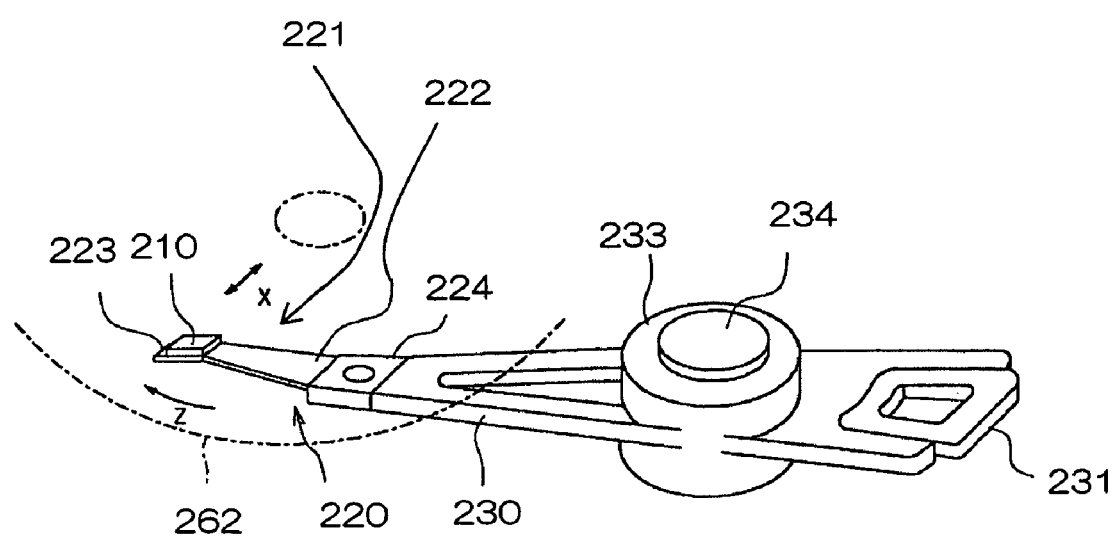
FIG. 7 is a perspective view illustrating a head arm assembly including the head gimbal assembly which incorporates a magnetoresistive sensor according to the present invention.

Referring to FIG. 7, explanation is next presented regarding head gimbal assembly having CPP sensor 2 employed as a head sensor. Head gimbal assembly 220 is provided with slider 210 and suspension 221 for resiliently supporting slider 210. Suspension 221 has; load beam 222 in a shape of flat spring and made of, for example, stainless steel; flexure 223 attached to one end of load beam 222, and to which slider 210 is fixed, while providing appropriate degree of freedom to slider 210; and base plate 224 provided in the other end of load beam 222. Base plate 224 is adapted to be attached to arm 230 of the actuator for moving slider 210 in the transverse direction of the track of the hard disk 262. The actuator is provided with arm 230 and a voice coil motor for driving arm 230. The portion of the flexure to which slider 210 is attached is provided with a gimbal section for maintaining a constant posture of slider 210.

Head gimbal assembly 220 is attached to arm 230 of the actuator. The arrangement having a head gimbal assembly attached to a single arm is called a head arm assembly.

The arrangement having head gimbal assemblies attached to respective arms of a carriage having a plurality of arms is called a head stack assembly. FIG. 7 illustrates an example of a head arm assembly, in which head gimbal assembly 220 is attached to one end of arm 230. To the other end of arm 230, there is attached coil 231, which makes a part of a voice coil motor. In the intermediate portion of arm 230, bearing section 233 is provided to fit on shaft 234 for rotatably holding arm 230.

Figure 8:
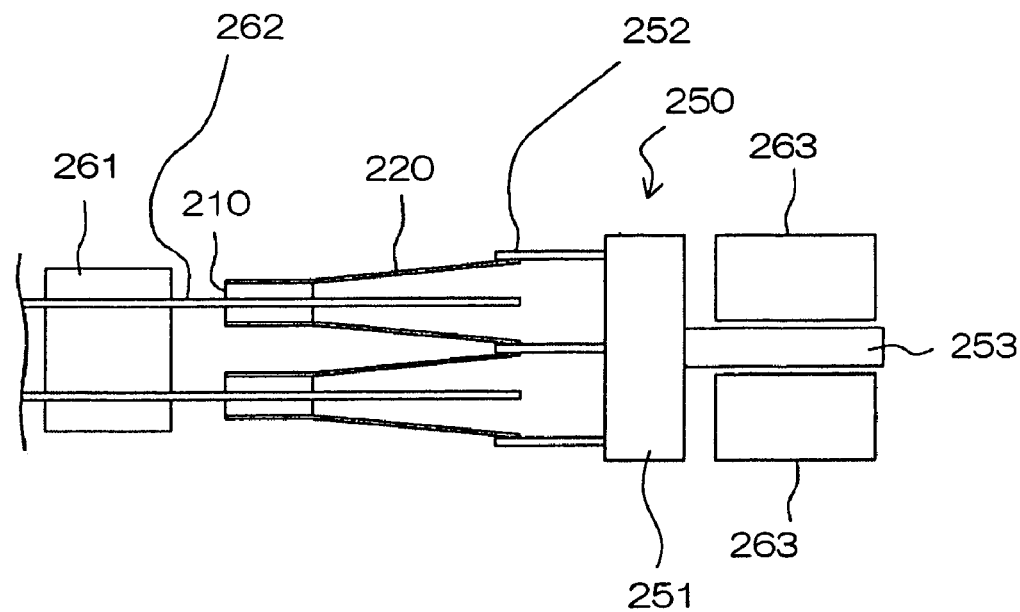
FIG. 8 is an explanatory diagram illustrating an essential part of a hard disk device which incorporates a magnetoresistive sensor according to the present invention.
Figure 9:
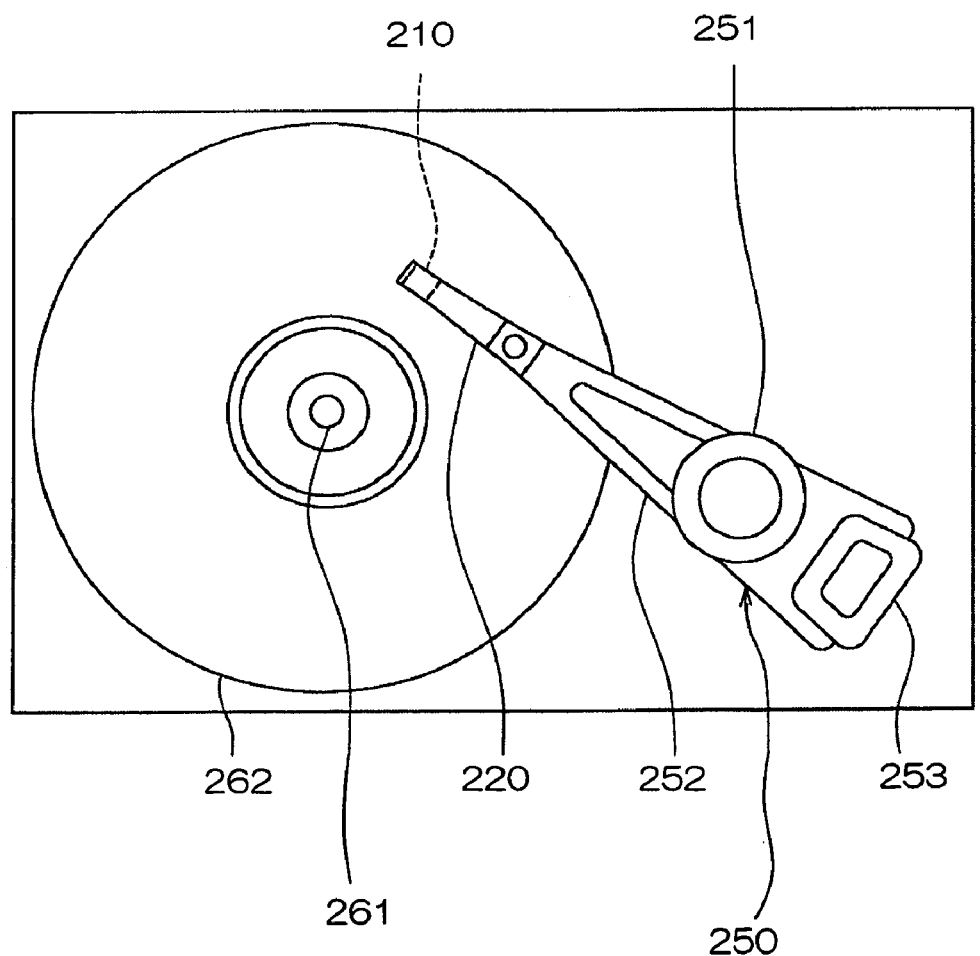
FIG. 9 is a plan view of a hard disk device which incorporates a magnetoresistive sensor according to the present invention.

Referring to FIG. 8 and FIG. 9, explanation is next presented regarding the head stack assembly and the hard disk device employing CPP sensor 2 as a head sensor. FIG. 8 is an explanatory diagram illustrating an essential part of the hard disk device, and FIG. 9 is a plan view of the hard disk device. Head stack assembly 250 has carriage 251 provided with a plurality of arms 252. A plurality of head gimbal assemblies 220 are attached to a plurality of arms 252. Head gimbal assemblies 220 is aligned spaced apart from each other in the vertical direction. Coil 253, which is a part of the voice coil, is attached to carriage 251 at the opposite side to arms 252. Head stack assembly 250 is installed in the hard disk device, which has a plurality of hard disks connected to spindle motor 261. Two sliders for each hard disk 262 are arranged in opposed positions interposing hard disk 262. The voice coil motor has permanent magnets 263 arranged in opposed positions interposing coil 253 of head stack assembly 250.

Head stack assembly 250 and the actuator, except for sliders 210, work as a locating device, carrying the sliders 210 and operating to locate sliders 210 relative to hard disks 262.

The hard disk device moves sliders 210 in the transverse directions of the tracks of hard disks 262 by the actuator, and locates sliders 210 relative to hard disks 262. The thin-film magnetic head contained in slider 210 records information to hard disk 262 through a write head, and also reads information recorded in hard disk 262 through a read head in which CPP sensor 2 is employed as a magnetic head.

It should be understood that the magnetoresistive sensor of the present invention is not limited to the above description. For example, the pinned layer may be made not only of a synthetic pinned layer, but of a single ferromagnetic layer. The NiFe layer may be added with an additive, represented by a trace of Co, as long as similar soft magnetic characteristics are maintained. Further, the overall configuration of the SV film is not limited to a bottom SV film, but may be a dual SV films. In this event, the layer configuration comprises a non-magnetic intermediate layer, a synthetic pinned layer, a antiferromagnetic layer, and a cap layer stacked in this order on a free layer.

Although a certain preferred embodiments of the present invention have been shown and described in detail, it should be understood that various changes and modifications may be made without departing from the spirit or scope of the appended claims.

What is claimed is:

1. A magnetoresistive sensor comprising:
a pinned layer having a magnetization direction fixed with respect to an external magnetic field;
a free layer, having a magnetization direction variable in accordance with the external magnetic field; and
a spacer layer mainly containing copper, sandwiched between said pinned layer and said free layer,
wherein a sense current flows through said pinned layer, said spacer layer, and said free layer substantially in a direction in which said layers are stacked, and
wherein said free layer comprises:
at least one intermediate stack having a non-magnetic layer mainly containing copper, and first cobalt iron layers made of a cobalt iron alloy and disposed on boundaries on both sides of said non-magnetic layer;
nickel iron alloy layers disposed on boundaries on both sides of said intermediate stack;
a second cobalt iron layer made of a cobalt iron alloy and formed in contact with said spacer layer on a boundary of a stack composed of said intermediate stack and said nickel iron alloy layers, said boundary opposing said spacer layer; and
a third cobalt iron layer including a cobalt iron alloy and formed on the other surface of said stack, wherein said first cobalt iron layers each have a cobalt atomic percent in a range from 65% to 75%, said second cobalt iron layer has a cobalt atomic percent in a range from 65% to 75%, and said third cobalt iron layer has a cobalt atomic percent in a range from 65% to 75%, and wherein said first cobalt iron layers each have a thickness in a range from 0.2 nm to 1.0 nm, said second cobalt iron layer has a thickness in a range from 0.5 nm to 1.5 nm, and said third cobalt iron layer has a thickness in a range from 0.5 nm to 1.5 nm.

2. The magnetoresistive sensor according to claim 1, wherein said second cobalt iron layer has a thickness of approximately 1 nm.

3. The magnetoresistive sensor according to claim 1, wherein said third cobalt iron layer has a thickness of approximately 1 nm.

4. The magnetoresistive sensor according to claim 1, wherein said nickel iron alloy layers each have a thickness of 1.5 nm or more and 3 nm or less.

5. The magnetoresistive sensor according to claim 1, wherein said first cobalt iron layers each have a cobalt atomic percent of approximately 70%, and a thickness of approximately 0.5 nm, wherein said second and third cobalt iron layers each have a cobalt atomic percent of approximately 70% and a thickness of approximately 1 nm, and wherein said nickel iron alloy layers each have a nickel atomic percent of approximately 81%, and a thickness of approximately 2 nm.

6. A thin-film magnetic head having the magnetoresistive sensor according to claim 1 on an air bearing surface opposing a recording medium for reading data recorded on said recording medium.

7. A head gimbal assembly comprising:
a slider including the thin-film magnetic head according to claim 6, and disposed opposite to said recording medium; and
a suspension for resiliently supporting said slider.

8. A hard disk drive comprising:
a slider including the thin-film magnetic head according to claim 6, and disposed opposite to a disciform recording medium driven for rotation; and
a positioning device for supporting said slider and positioning said slider relative to said recording medium.

9. A free layer for a magnetoresistive sensor, said free layer comprising:
at least one intermediate stack comprising a non-magnetic layer including copper, and first cobalt iron layers comprising a cobalt iron alloy and disposed on boundaries on both sides of said non-magnetic layer, said first cobalt iron layers comprising a cobalt atomic percent in a range from 65% to 75% and a thickness in a range from 0.2 nm to 1.0 nm;

nickel iron alloy layers disposed an boundaries on both sides of said intermediate stack;

a second cobalt iron layer comprising a cobalt iron alloy and formed on a boundary on a side of a stack comprising said intermediate stack and said nickel iron alloy layers, said second cobalt iron layer comprising a cobalt atomic percent in a range from 65% to 75% and a thickness in a range from 0.5 nm to 1.5 nm; and a third cobalt iron layer comprising a cobalt iron alloy and formed on a boundary on the other side of said stack, said third cobalt iron layer comprising a cobalt atomic percent in a range from 65% to 75% and a thickness in a range from 0.5 nm to 1.5 nm.

10. The free layer of claim 9, wherein said second cobalt iron layer is formed in contact with a spacer layer of said sensor.

11. The free layer of claim 9, wherein said free layer comprises a magnetization direction variable in accordance with an external magnetic field.

* * * * *